United States Patent
Perona et al.

(10) Patent No.: US 6,813,648 B1
(45) Date of Patent: Nov. 2, 2004

(54) METHOD AND APPARATUS FOR POST BOOT-UP DOMAIN VALIDATION

(75) Inventors: Leigh A. Perona, Fremont, CA (US); Francis L. Nguyen, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 318 days.

(21) Appl. No.: 09/898,214

(22) Filed: Jul. 2, 2001

(51) Int. Cl.[7] .............................................. G06F 3/00
(52) U.S. Cl. .............................. 710/8; 710/16; 710/60; 710/100; 710/10
(58) Field of Search ........................... 710/8, 10, 5, 16, 710/60, 100

(56) References Cited

U.S. PATENT DOCUMENTS

| | | | | |
|---|---|---|---|---|
| 5,778,420 A | * | 7/1998 | Shitara et al. ............... | 711/113 |
| 5,862,352 A | * | 1/1999 | Muresan ...................... | 710/105 |
| 5,890,014 A | * | 3/1999 | Long .............................. | 710/8 |
| 5,915,106 A | * | 6/1999 | Ard .............................. | 703/23 |
| 6,463,552 B1 | * | 10/2002 | Jibbe ........................... | 714/33 |

* cited by examiner

Primary Examiner—Jeffrey Gaffin
Assistant Examiner—Justin Knapp
(74) Attorney, Agent, or Firm—Martine & Penilla, LLP

(57) ABSTRACT

A method for performing domain validation testing of SCSI devices connected to a SCSI bus is provided. The method includes booting up a computer system having a SCSI device connected to the SCSI bus. The method also includes launching a domain validation utility after booting up of the computer system is complete and selecting a set of domain validation parameters using the domain validation utility. Further included in the method is issuing a domain validation command implementing the set of domain validation parameters. Performing the domain validation of the SCSI device is designed to enable validation of an optimum data transfer speed of the SCSI device over the SCSI bus.

20 Claims, 3 Drawing Sheets

METHOD AND APPARATUS FOR POST BOOT-UP DOMAIN VALIDATION

BACKGROUND OF THE INVENTION

1. Field of the Invention

The present invention relates generally to the field of computing technology, and more particularly, to domain validation testing performed for Small Computer System Interface ("SCSI") devices connected to a SCSI bus.

2. Description of the Related Art

Today, many computer systems implement Small Computer System Interface ("SCSI") connections to provide the fastest and most versatile manner of communication between computer systems and their associated peripheral devices. Implementing SCSI technology has enabled computer users to connect a wide variety of internal and external peripheral devices to personal computers. Typically, for a SCSI connection, a single SCSI host adapter (also known as SCSI card or SCSI controller) is plugged to one expansion slot on the peripheral component interconnect (PCI) bus. Normally, up to 7 (or 15 for dual channel SCSI) peripheral devices (also known as SCSI devices) are connected to a single SCSI host adapter card and are daisy chained to one another creating a SCSI bus (also known as a SCSI domain). As each of the SCSI devices on the SCSI domain is installed, depending on its priority, each SCSI device is assigned a unique identification (ID) number ranging from 0 to 6 and 8 to 15. Having the highest priority, the SCSI host adapter is assigned identification number 7. Generally, a single SCSI bus may include a SCSI host adapter and a plurality of SCSI devices, and each device may be capable of supporting a different data transfer rate. Obviously, in order to establish proper communication, each SCSI host adapter must ascertain the data transfer rate each SCSI device is capable of supporting.

Presently, a process called "negotiation" is implemented by SCSI host adapters to determine the speed supported by each of SCSI devices. This process is performed by an initiator (normally, the SCSI host adapter) at the time the computer system is powered up. Specifically, during the booting-up of the computer system, the system BIOS executes a boot program during which a series of system checks determine the location, number, and identity of various devices connected to the computer system. As the SCSI host adapter card is one of such devices, the system BIOS passes control to an option ROM BIOS chip on the SCSI host adapter card. Once invoked, the option ROM BIOS scans the SCSI bus to ascertain the identity of each SCSI device on the SCSI bus.

During the negotiation process, the initiator/SCSI host adapter interrogates each of its targets/SCSI devices on the SCSI bus determining the specific speed supported by each of the SCSI devices. Thereafter, the SCSI host adapter records the maximum transfer speed claimed to be supported by each of SCSI devices, and subsequently uses these speeds to access each of the associated SCSI devices during normal operation. Although the negotiation protocol works in theory, in certain situations, the negotiated speeds may not be trusted. In practice, transferring data using the negotiated speed may be hindered for several reasons. These reasons include, for example, implementing too long, inferior, or damaged cables, improper termination, damaged SCSI bus transceivers, narrow cabling between wide initiator SCSI host adapters, expanders being incapable of supporting the negotiated data transfer scheme, etc. As these drawbacks are manifested in the form of data errors or reliability problems, a domain validation ("DV") testing feature has been introduced to improve the negotiation process.

Domain validation testing adds a verification step to the normal negotiation procedure performed during the booting-up of the computer system. Subsequent to the completion of each initiator/target negotiation, the domain validation testing performed during the booting-up of the computer system ensures that each initiator and target can actually transfer data at the negotiated speed. If it is determined that the negotiated data transfer speed is not achievable, a signal is sent to the SCSI host adapter to renegotiate with the target so as to select a data transfer speed that is lower. Ideally, the renegotiation/testing cycle should continue until a suitable data transfer speed is achieved or until all possibilities are exhausted. However, due to the advances in the art, less and less time can be allocated to domain validation testing during boot up.

Particularly, as computer manufacturers push for faster and faster boot initiatives, less and less time can be allocated to the domain validation testing of the SCSI buses during the booting-up process. In achieving this, the domain validation testing is significantly cut back or simplified, thus creating a variety of problems. For instance, in certain situations, decreasing the domain validation testing may cause a target's speed to be validated at a higher speed wherein communication is not reliable, thus lowering data integrity. In another situation, despite both initiator and target being capable of supporting a certain speed, the data transfer rate of the SCSI device may fall back to a lower transfer rate, frustrating the users. In a different scenario the host adapter may be scanning the SCSI bus when all the computer system components are not yet fully up and running. In these situations, the targeted device may be validated at a higher speed wherein communication is not reliable. In other situations, devices emitting electrical noise ultimately interfere with the fastest validated SCSI speed causing improper validation.

In view of the foregoing, there is a need for a new methodology and apparatus capable of providing computer users an opportunity to perform an unlimited, and extensive domain validation testing of devices connected to SCSI buses.

SUMMARY OF THE INVENTION

Broadly speaking, the present invention fills these needs by providing an apparatus and methods for performing unlimited and extensive domain validation testing of Small Computer Interface System (SCSI) connections when the computer system is operational. As used herein, operational refers to a state where a computer has completed a boot operation and all working devices connected to the computer (e.g., peripheral devices) have been initiated and validated for operation. Preferably, the domain validation utility of the present invention performs the domain validation testing subsequent to the booting-up of the computer system, thus enabling a user to perform unlimited and extensive testing of the SCSI devices. It should be appreciated that the present invention can be implemented in numerous ways, including as a process, an apparatus, a system, a device, or a method. Several inventive embodiments of the present invention are described below.

In one embodiment, a method for performing domain validation testing of SCSI devices connected to a SCSI bus is disclosed. The method includes booting up a computer system having a SCSI device connected to the SCSI bus. The method also includes launching a domain validation utility after booting up of the computer system is complete and selecting a set of domain validation parameters using the domain validation utility. Further included in the method is issuing a domain validation command implementing the set of domain validation parameters. Performing the domain validation of the SCSI device is designed to enable validation of an optimum data transfer speed of the SCSI device over the SCSI bus.

In another embodiment, a method for implementing domain validation to ensure integrity of data transfers between devices on a SCSI bus is disclosed. The method includes booting-up a computer to normal operating system operation and launching a domain validation utility. Further included is setting options for domain validation between an initiator and a target using a domain validation utility interface by selecting a parameter for each option. The method also includes running the domain validation utility using the parameters and analyzing a result. When the result indicates less than optimum operation of the target, an adjustment is made in a negotiation speed parameter so as to establish an optimum data transfer speed between the initiator and the target over the SCSI bus.

In yet another embodiment, a method for implementing a domain validation utility to perform on-demand domain validation of a SCSI device connected to a SCSI bus, thus ensuring the integrity of data transferred between a SCSI host adapter and the SCSI device is disclosed. The method includes setting options using a domain validation utility interface that loads after boot up of a computer system that is connected to the SCSI bus. Setting the options includes selecting an initiator parameter, a target parameter, a data pattern parameter, a negotiation speed parameter, and an iteration number parameter. The initiator parameter is selected from an initiator option designed to include a set of initiator parameters and the target parameter is selected from a target option designed to include a set of target parameters. The data pattern parameter is selected from a data pattern option designed to include a set of data pattern parameters. The negotiation speed parameter is selected from a negotiation speed option designed to include a set of negotiation speed parameters and the iteration number parameter is selected from an iteration number option designed to include a set of iteration number parameters. The method also includes executing domain validation testing using the set parameters.

The advantages of the present invention are numerous. Most notably, the domain validation utility of the present invention performs domain validation testing subsequent to the booting-up of the computer system and when the computer system is operational. In contrast to boot-time domain validation of the prior art, the embodiments of the present invention can perform unlimited and extensive domain validation testing of the SCSI devices implementing a plurality of data patterns and iterations. Consequently, the domain validation utility of the present invention detects and bypasses errors undetected or caused by limiting the domain validation testing performed during the booting-up of the computer.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention for computer implemented methods for selectively performing an unlimited, on-demand, and comprehensive domain validation testing of a Small Computer System Interface (SCSI) connection is provided. Preferably, the domain validation testing of the present invention is invoked subsequent to the booting-up of the computer system and when the computer system is operational, thus enabling the computer user to perform a comprehensive and unlimited domain validation testing of the SCSI communication. Accordingly, the domain validation utility of the present invention is capable of detecting and bypassing errors caused by constraining the performance of domain validation testing during the booting-up of the computer system.

Figure 1:
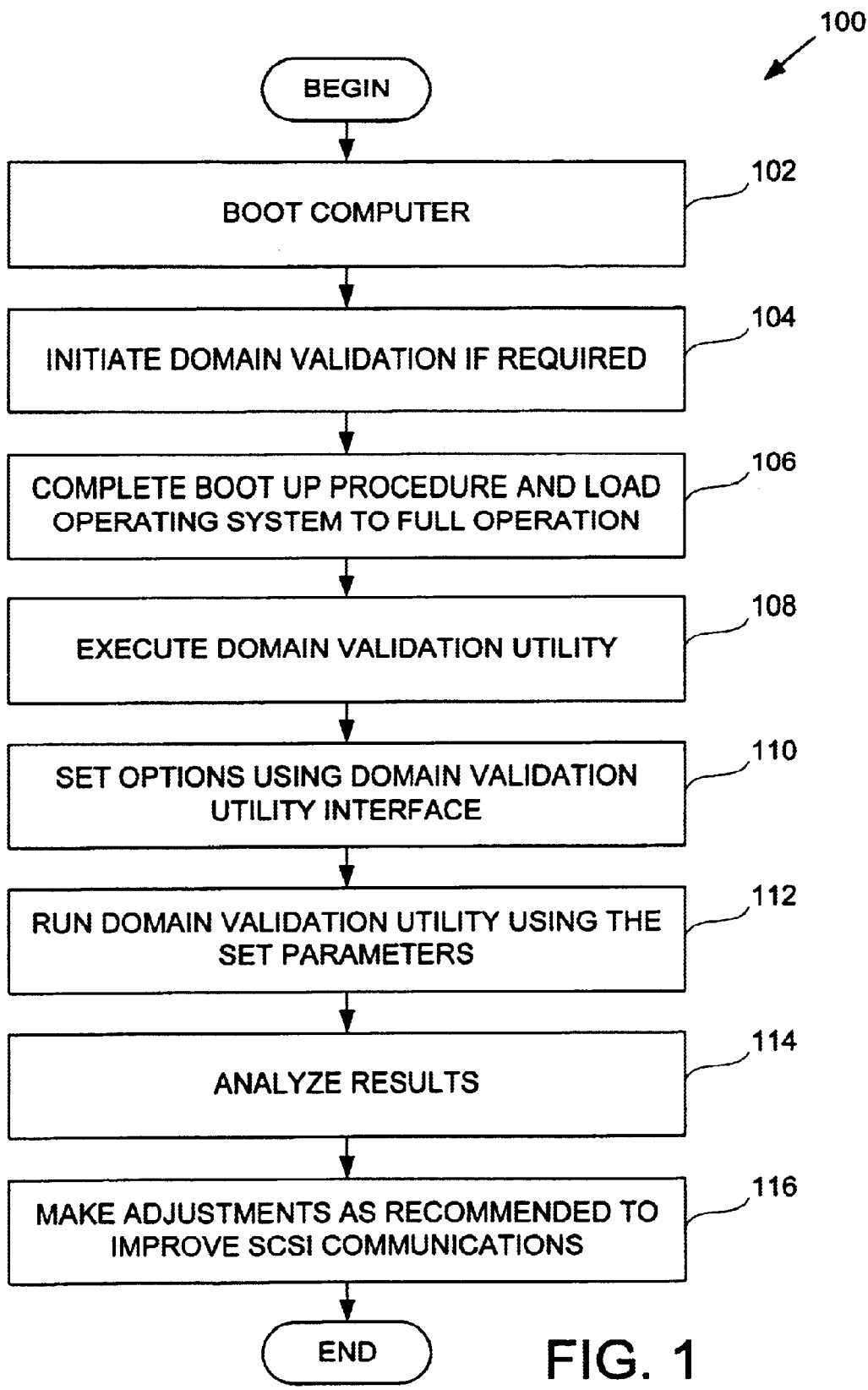
FIG. 1 illustrates a flowchart diagram of the methods operations performed in implementing, executing, and analyzing a domain validation utility, in accordance with one embodiment of the present invention.

Reference is now made to FIG. 1 illustrating a flowchart diagram 100 of the methods operations performed in implementing, executing, and analyzing a domain validation utility, in accordance with one embodiment of the present invention. The method begins in operation 102 wherein the computer system is booted. That is, upon turning on the computer, a Power-On Self-Test (POST) is performed during which a boot program is executed. Typically, the boot program is stored in a read-only memory (ROM) chip containing the computer's Basic Input/Output System (BIOS). At this point, the system BIOS finds all of the SCSI host adapter cards connected to the computer motherboard. Next, the system BIOS interrogates a SCSI option ROM placed on each of the SCSI host adapter cards determining all of the peripheral devices (e.g., hard drives, tape drives, Compact Disk Recordable ("CD-R"), Compact Disk ReWritable ("CD-RW"), tape, removal storage ("JAZ"), DVD drives, scanners, zip drives, Compact Disk Read Only Memory "CD-ROM", etc.) connected to each SCSI host adapter card.

During the interrogations, each of the peripheral SCSI devices are assigned a unique identification number (ID) based on the priority of each SCSI device. Typically, the SCSI device priority identification numbers start at seven (7) decrementing down to zero (0) and then from 15 decrementing down to eight (8), with the SCSI host adapter having the highest priority identification number, seven (7). Subsequent to ascertaining the list of SCSI devices attached to each SCSI host adapter and their priorities, negotiation with the SCSI devices begins. Namely, the SCSI host adapter (i.e., the SCSI controller) interrogates each of the SCSI devices on the SCSI host adapter bus determining the highest transfer speed supported by each of the SCSI devices. Then, the maximum transfer speed of each SCSI device is recorded so as to be used when accessing each specific SCSI device.

Next, in operation 104, if required, the method initiates domain validation testing. Specifically, the domain validation testing is performed if the domain validation testing option in the Selection section of the SCSI Utility menu is enabled. As is well known, the computer user may choose to permanently disable the domain validation testing feature implemented in the SCSI communication protocols. However, unless disabled, each of the SCSI host adapters performs a domain validation testing of all of their respective SCSI devices during booting-up of the computer. That is, each SCSI host adapter confirms that each SCSI device is capable of transferring data at the negotiated speed. In one embodiment, this is achieved by each SCSI host adapter sending write requests to the internal echo buffer of each SCSI device at the negotiated speed. Then, the data just written to each of the SCSI devices is read back and subsequently compared against the data written. If the echoed data is different, the boot-time domain validation feature signals the SCSI host adapter as to the unreliability of the negotiated speed. As a result, "fall back" occurs, i.e., renegotiating for a less demanding data transfer speed. At that point, the SCSI host adapter retries using the next lower data transfer rate and continues to do so until a suitable and reliable data transfer scheme is achieved or until all possibilities are exhausted.

The method then proceeds to operation 106 in which the boot up procedure is completed and the computer system operating system is loaded to full operation. That is, once the system BIOS has ensured the proper functioning of all the host adapter cards, the operating system is loaded, concluding the booting-up procedure of the computer system. Next, in operation 108, the domain validation utility is executed. As evident, the domain validation utility of the present invention is designed to perform supplemental, unlimited, and extensive domain validation testing subsequent to and in addition to the domain validation testing performed during the booting-up of the computer system. Additional details in regards to executing the domain validation utility are set forth below in connection with FIGS. 2A–2C and FIG. 3.

Moving to operation 110, the method sets options using the domain validation utility interface. For instance, in a computer system implementing Windows™, upon executing the domain validation utility, a domain validate Graphical User Interface (GUI) appears on the display system. In one example, the GUI includes a plurality of options (i.e., criteria) determined by the domain validation utility to affect the communications between the SCSI controllers and the associated SCSI devices when the system components are operating. As will be described in detail with reference to FIG. 2C, in one embodiment, the GUI presents the user with a plurality of options such as Initiator select, Target Select, and Test Select. As shown in FIG. 2C, the Target Select option itself may include a plurality of associated sub-options such as Pattern, Negotiation Speed, and Iteration. Preferably, each of the Initiator Select and Target select options is configured to include a plurality of parameters (i.e., all of the SCSI controllers connected to the computer system and each of their associated SCSI devices, respectively). Additionally, the Test Select option and its associated sub-options are configured to include parameters designed to assist the user in ascertaining and overcoming problems encountered during SCSI communication testing.

In this manner, the GUI allows the user to run the domain validation utility on any possible combination of selected parameters. Therefore, the user may perform the domain validation testing on any of the possible initiators implementing any of the possible test patterns, negotiation speeds, and iterations.

Proceeding to operation 112, the method runs the domain validation utility using the set parameters. Specifically, in this operation, the domain validation utility is run on each of the selected initiator parameters and the associated target parameters using the selected pattern parameters, negotiation speed parameters, and iteration parameters. Subsequently, in operation 114, the results obtained in operation 112 are analyzed. By way of example, in one embodiment, a pull down GUI may appear on the display system which includes a summary of the tests performed, a list of errors and results obtained through running of the domain validation utility, a list of suggestions and recommendations that if implemented, may eliminate the encountered errors.

Next, the method advances to operation 116 in which adjustments in speed are made as recommended, thus improving the SCSI communications. At this point, the computer user may implement the recommendations and suggestions provided by the domain validation utility to make the necessary adjustments to any of the effected components.

Figure 2A:
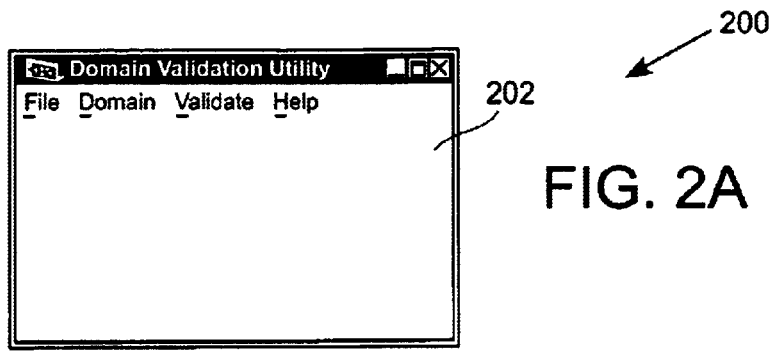
FIG. 2A depicts an exemplary domain validation utility Graphical User Interface (GUI), in accordance with another embodiment of the present invention.
Figure 2B:
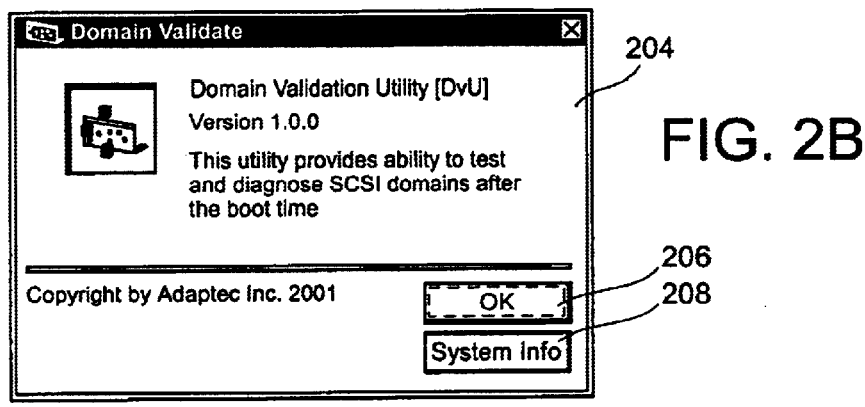
FIG. 2B illustrates another exemplary domain validation utility Graphical User Interface (GUI), in accordance with yet another embodiment of the present invention.
Figure 2C:
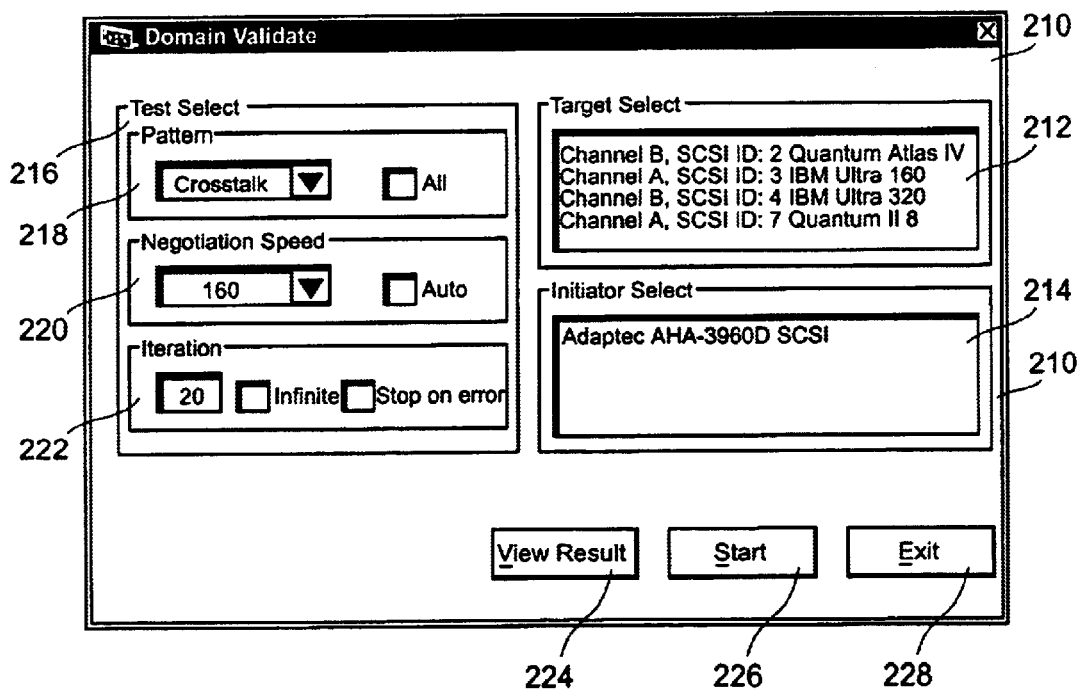
FIG. 2C shows yet another exemplary domain validation utility Graphical User Interface (GUI), in accordance with still another embodiment of the present invention.

FIGS. 2A–2C depict exemplary domain validation utility Graphical User Interfaces (GUI), in accordance with one embodiment of the present invention. As shown in the embodiment of FIG. 2A, in a Windows™ environment, the domain validation utility may be invoked using the Programs submenu of the Start menu. For instance, the domain validation utility GUI 202 includes a tool bar containing a plurality of pull down menus "File," "Domain Validate," and "Help." Once the domain validation utility is invoked, an "About" GUI 204 may provide the user certain information concerning the domain validation utility such as, the version and the function of the domain validation utility. As shown in FIG. 2B, the user may proceed to perform a domain validation testing by pressing on an "OK" button 206. Furthermore, the "About" GUI 204 may allow the user to inquire as to the computer system configuration and information by pressing on a "System Information" button 208.

As shown in FIG. 2C, an exemplary Domain Validate GUI 210 includes three major categories: an "Initiator Select" box 214, a "Target Select" box 212, and a "Test Select" box 216. Once the user has selected the initiator, the target, the data test pattern, the negotiation speed, and the number of iterations, a user can run the domain validation utility by pressing on a "Start" button 226. As shown, the user can view the results of the domain validation testing by pressing on a "View Result" button 224. In this manner, the user is provided with substantially all the errors (if any) detected during the post boot-up domain validation testing.

Preferably, the Initiator Select box 214 is configured to display all of the SCSI host adapter cards connected to the motherboard. In a like manner, the Target Select 212 is configured to include all of the SCSI devices connected to each of the SCSI host adapters defined within the Initiator Select box 214. As shown in the exemplary embodiment depicted in FIG. 3C, the Initiator Select box 214 includes a SCSI host adapter "Adaptec AHA-3960D" which as illustrated in the Target Select box 212 supports two separate channels "A" and "B" of SCSI devices. Therefore, in one example, the user may choose to simultaneously perform the domain validation testing on both of SCSI channels A and B. Alternatively, the user may choose to perform separate domain validation testing on the SCSI devices in each of the SCSI channels separately, or perform the domain validation testing only on a specific SCSI device on a specific channel. For instance, if the user selects to perform the domain validation testing on a specific SCSI device on channel A, the user is prohibited from performing the domain validation testing on a SCSI device on channel B simultaneously. In a different embodiment, if the user selects a single initiator out of a plurality of initiators defined within the Initiator Select box 214 of the GUI 210, the Target Select box 212 has been designed such that it allows the user to perform the domain validation on the targets defined within the SCSI bus of that specific initiator only. For example, once an initiator has been selected, the SCSI targets defined within the SCSI buses associated with the remaining SCSI host adapters may become automatically inaccessible either by being dropped out or grayed out of the Target Select box 212.

With a continued reference to FIG. 2C, the illustrated Test Select box 216 includes a Pattern pick box 218, a Negotiation Speed pick box 220, and an Iteration pick box 222. As shown, a user has the option to select one, all, or any of the test data patterns provided within the Pattern pick box 218. As will be discussed in more detail with respect to FIG. 3, the data patterns are configured to detect a variety of transmission sensitivities in marginal SCSI configurations. Exemplary data patterns may be Counting, Alternating Ones and Zeros, Crosstalk, Shifting Bit, etc.

As shown, the Negotiation Speed pick box 220 also provides a user with a plurality of options. However, the user's selection of the Negotiation Speed is narrowed down once the user selects a specific initiator and its associated targets. Specifically, the user's selection is limited by the highest data transfer rate associated with each SCSI target. Depending on the situation, the Negotiation Speed 220 may be the highest data transfer rate actually supported by the SCSI target or the negotiated fall back data transfer rate. For instance, in the exemplary embodiment depicted in FIG. 2C, the maximum data transfer rate supported by each of the SCSI target devices within either channel A or B is 160 MB/sec. However, during the initiator/target negotiation performed during the boot-up domain validation, the SCSI target may have been forced to a lower data transfer speed. Thus, domain validation utility of the present invention allows the user to perform the unlimited post boot-up domain validation testing using the actual maximum data transfer rate of the SCSI device. By enforcing the maximum data transfer rate on the SCSI device during the domain validation testing, the user can be informed of any problems that may exist.

Further included in the Test Select box 216 is the Iteration pick box 222 through which the user can select the number of times each data pattern can be tested. For instance, as shown in the implementation of FIG. 2C, the user may select to repeat the testing infinite times. Additionally, as will be discussed in more detail in reference to FIG. 3, the user may choose to stop the domain validation testing once an error has been detected.

Figure 3:
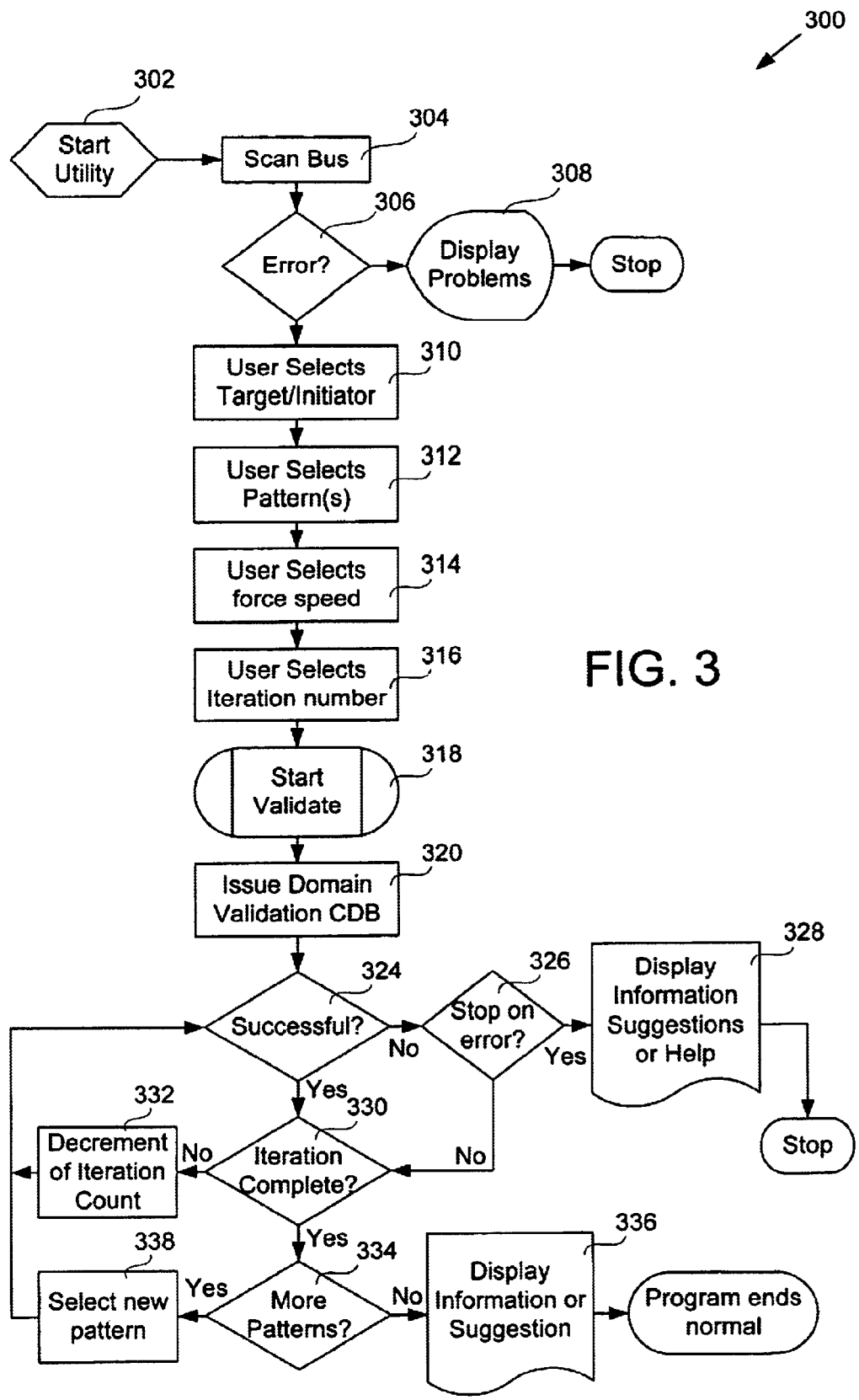
FIG. 3 is flowchart diagram illustrating the method operations implemented in running the domain validation utility, in accordance with still another embodiment of the present invention.

FIG. 3 is flowchart diagram 300 illustrating the method operations implemented in running the post boot-up domain validation utility, in accordance with one embodiment of the present invention. The method begins by starting the domain validation utility in operation 302. As described in detail above in reference to FIG. 2, in one exemplary embodiment implemented in a Windows™ platform, the domain validation utility may be started using the Programs submenu of the Start menu. Next, in operation 304, the SCSI bus is scanned by code of the option ROM chip of the SCSI host adapter card so as to locate all peripheral SCSI devices attached to that particular SCSI host adapter card. Subsequently, the SCSI host adapter starts negotiating with each of the attached SCSI devices. Namely, the SCSI host adapter interrogates each of the SCSI devices on the SCSI host adapter bus to determine the highest transfer speed each SCSI device can support. Then, the maximum transfer speed of each SCSI device is recorded so as to be used at the time each specific SCSI device is to be accessed. It must be noted that operation 304 is performed on each of the SCSI buses so as to ascertain each SCSI host adapter card and their associated SCSI devices. By performing operation 304, the method in effect collects and fills in substantially all the data necessary to perform a domain validation testing.

Advancing to operation 306, a determination is made as to whether any errors have been encountered during the scanning of the SCSI bus. If any errors have been detected, the method moves to operation 308 in which the identified errors are displayed. If no errors have been discovered during operation 306, the method continues to operation 310 in which the user selects the target/initiator. As described in more detail with respect to FIG. 2C, the user may select any of the enumerated SCSI host adapters and each of their associated SCSI devices to act as initiators and targets, respectively. However, one having ordinary skill in the art must appreciate that in a different implementation, any of the SCSI devices may act as an initiator while the associated SCSI host adapter acts as a target. Again, as described in more detail in connection with FIG. 2C, once the user selects an initiator (e.g., a specific SCSI host adapter), the domain validation utility performs the on-demand domain validation testing only on the targets (e.g., the SCSI devices) connected to that specific initiator. In this manner, the user can substantially focus the domain validation testing on solely one specific SCSI connection rather than on all of the SCSI connections. Furthermore, in situations the SCSI host adapter card is connected to more than one channel, the user can further limit the domain validation testing on only one particular channel.

Subsequently, in operation 312, the user selects the data patterns. As discussed in more detail with respect to FIG. 2C, the user may select as many data patterns as needed. As evident, this is due to performing the domain validation testing post booting-up of the computer system, thus allowing the utility to continue testing for any length of time. Furthermore, because several different factors may cause the negotiated data transfer rate between the initiator and the target to fall back, the domain validation utility of the present invention beneficially allows a user to perform domain validation testing using data patterns capable of detecting a variety of data transmission problems. For instance, in one embodiment, the user may implement any or all of the data patterns provided in Table 1.

TABLE 1

Domain Validation Utility Data Patterns

| Name | Data Patterns |
| --- | --- |
| Counting | 0001h, 0203h, 0304h, . . . |
| Alternating Ones and Zeros | 0000h, FFFFh, 0000h, FFFFh, . . . |

TABLE 1-continued

Domain Validation Utility Data Patterns

| Name | Data Patterns |
|---|---|
| Crosstalk | 5555h, AAAAh, 5555h, AAAAh, . . . |
| Shifting Bit | 0000h, FFFEh, FFFDh, . . . , FFFFh, 0001h, FFFFh, 0002h, . . . |

Thereafter, in operations 314 and 316, the user selects the force speed and the iteration number, respectively. As discussed in more detail in FIG. 2C, the force speed is the optimum data transfer rate supported by each specific target. In one embodiment, the optimum data transfer rate supported by each specific target is the maximum data transfer rate supported by each specific target. This is specifically beneficial in situations where both the target and the initiator support a particular transfer rate but due to problems with the SCSI bus configuration, the initiator keeps falling back the speed of the target to a lower transfer rate. Additionally, as the domain validation testing of present invention does not have a time constraint, each data pattern may be run as many times as necessary or selected by the user.

Continuing to operation 318, the method starts the validation process by proceeding to issue the domain validation command data block (CDB) in operation 320. In achieving this task, the initiator must first determine the size of an echo buffer. As used herein, the echo buffer is an optional buffer located on the target device used as temporary storage during the domain validation testing of the target device.

By way of example, the echo buffer size can be determined through the initiator transmitting a "Read Buffer" command to extract an "Echo Buffer Descriptor" designed to indicate the echo buffer size. In one embodiment, the echo buffer may be configured to be a 252-character echo buffer. However, it must be recognized by one having ordinary skill in the art that the size of the echo buffer may vary depending on the target device.

After determining the echo buffer size, the initiator commences data pattern echoing. That is, the initiator compares data transmitted from the initiator to the SCSI device with the data sent back from the SCSI device to the initiator. For example, the initiator may transmit data using a "Write Buffer" command with the echo buffer option and request it back using a "Read Buffer" command with the echo buffer option.

Proceeding to operation 324, a determination is made as to whether the domain validation CDB was issued successfully, i.e., whether the data transmitted to the SCSI device by the initiator implementing the forced speed is equal to the data transmitted back to the initiator by the SCSI device. In the event the domain validation CDB was not issued successfully, the method continues to operation 326 in which a determination is made as to whether the user has selected the "Stop on Error" option. That is, a determination is made as to whether the user has elected to continue further testing past the detection of the first error or point of failure. If the user has made such a selection, the method proceeds to operation 328 in which information, suggestions, or help is displayed to the user. Otherwise, the method continues to operation 330 described in more detail below. In this manner, the user is given the opportunity to face and overcome each error once it occurs. On the other hand, if the domain validation CDB was issued successfully, the optimum data transfer speed of the SCSI device over the SCSI bus has been achieved.

Once a determination is made that the domain validation CDB was issued successfully, the method advances to operation 330 in which a determination is made as to whether the number of iterations have completed. If the number of iterations have not been completed, the method moves to operation 332 in which the iteration count is decremented after which the method returns to operation 320 wherein another domain validation CDB is issued. If the number of iterations have completed, continuing to operation 334, a determination is made as to whether any additional data patterns exist. If all of the data patterns have been tested, in operation 336, the information and suggestions produced as a result of the domain validation testing are displayed for the user. Alternatively, in operation 338, the method selects a new data pattern and returns to operation 320 wherein a new domain validation CDB is issued.

It must be appreciated by one having ordinary skill in the art that the SCSI controller of the present invention may be integrated into a motherboard of a computer systems as opposed to being on an adapter card. Additionally, the present invention may be implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for performing domain validation testing of SCSI devices connected to a SCSI bus, the method comprising:

booting up a computer system having a SCSI device connected to the SCSI bus;

launching a domain validation utility after booting up of the computer system is complete;

selecting a set of domain validation parameters using the domain validation utility, each domain validation parameter being selected from a corresponding set of predetermined parameters; and issuing a domain validation command implementing the set of domain validation parameters, wherein performing the domain validation of the SCSI device is configured to enable validation of an optimum data transfer speed of the SCSI device over the SCSI bus.

2. A method as recited in claim 1, wherein selecting the set of domain validation parameters includes, selecting a data pattern;

selecting a forced speed; and selecting an iteration count.

3. A method as recited in claim 2, wherein the forced speed is the optimum data transfer speed of the SCSI device.

4. A method as recited in claim 1, wherein issuing the domain validation command implementing the set of domain validation parameters includes, sending a write request to the SCSI device by SCSI host adapter using the forced speed and the data pattern;

reading back the write request to the SCSI host adapter by the SCSI device; and comparing the write request with a read back write request.

5. A method as recited in claim 4, further comprising decrementing the iteration count when the write request is substantially equivalent to the read back write request and the iteration count is greater than zero.

6. A method as recited in claim 4, further comprising stopping the domain validation when the write request is not substantially equivalent to the read back write request and a user has selected a stop on error option.

7. A method as recited in claim 6, further comprising displaying information, suggestions, and help to the user.

8. A method as recited in claim 4, further comprising selecting a new data pattern when the write request is substantially equivalent to the read back write request, the iteration count equals zero, and the new data pattern exists.

9. A method as recited in claim 4, further comprising displaying information and suggestions to the user when the write request is substantially equivalent to the read back write request, the iteration count equals zero, and a new data pattern does not exist.

10. A method for implementing domain validation to ensure integrity of data transfers between devices on a SCSI bus, the method comprising:

booting-up a computer to normal operating system operation;

launching a domain validation utility;

setting options for domain validation between an initiator and a target using a domain validation utility interface by selecting a parameter for each option;

running the domain validation utility using the parameters;

analyzing a result; and if the result indicates less than optimum operation of the target, the method further includes, making an adjustment in a negotiation speed parameter so as to establish an optimum data transfer speed between the initiator and the target over the SCSI bus.

11. A method for implementing domain validation to ensure integrity of data transfers between devices on a SCSI bus as recited in claim 10, wherein the domain validation utility interface includes an initiator option, a target option, a data pattern option, the negotiation speed option, and an iteration number option.

12. A method for implementing domain validation to ensure integrity of data transfers between devices on a SCSI bus as recited in claim 11, wherein the initiator option includes one of a SCSI host adapter parameter and a SCSI device.

13. A method for implementing domain validation to ensure integrity of data transfers between devices on a SCSI bus as recited in claim 11, wherein the target option includes one of a SCSI host adapter parameter and a SCSI device parameter.

14. A method for implementing a domain validation utility to perform on-demand domain validation of a SCSI device connected to a SCSI bus so as to ensure the integrity of data transferred between a SCSI host adapter and the SCSI device, comprising:

setting options using a domain validation utility interface that loads after boot up of a computer system having the SCSI bus connected thereto, the setting includes, selecting an initiator parameter from an initiator option configured to include a set of initiator parameters;

selecting a target parameter from a target option configured to include a set of target parameters;

selecting a data pattern parameter from a data pattern option configured to include a set of data pattern parameters;

selecting a negotiation speed parameter from a negotiation speed option configured to include a set of negotiation speed parameters; and selecting an iteration number parameter from an iteration number option configured to include a set of iteration number parameters; and executing domain validation testing using the set parameters.

15. A method as recited in claim 14, wherein a selected negotiation speed parameter is configured to be a maximum data transfer speed handled by a selected target parameter.

16. A method as recited in claim 14, wherein executing domain validation testing using the set parameters includes, issuing a domain validation command implementing the set parameters.

17. A method as recited in claim 16, wherein issuing the domain validation command implementing the set parameters includes, sending a write request to a selected target parameter by a selected initiator parameter using a selected negotiation speed parameter and a selected data pattern parameter;

reading back the write request to the selected initiator parameter by the selected target parameter; and comparing the write request with a read back write request.

18. A method as recited in claim 17, further comprising stopping the execution of domain validation testing when the write request is not substantially equivalent to the read back write request and a stop on error option has been selected.

19. A method as recited in claim 14, wherein a selected target parameter is the SCSI device.

20. A method as recited in claim 14, wherein a selected initiator parameter is the SCSI host adapter.

* * * * *